United States Patent [19]

Nishimura

[11] Patent Number: 4,488,003
[45] Date of Patent: Dec. 11, 1984

[54] DATA COMMUNICATION SYSTEM
[75] Inventor: Toshihiko Nishimura, Kobe, Japan
[73] Assignee: Mitsubishi Denki Kabushiki Kaisha, Tokyo, Japan
[21] Appl. No.: 479,904
[22] Filed: Mar. 29, 1983
[30] Foreign Application Priority Data Apr. 12, 1982 [JP] Japan .................. 57-62154

[51] Int. Cl.$^3$ .......................................... H04M 11/00
[52] U.S. Cl. .................. 179/2 C; 179/2 DP; 179/5 R
[58] Field of Search ............... 179/2 C, 2 CA, 2 DP, 179/2 A, 2 AM, 5 R, 5 P, 6.14; 375/8

[56] References Cited

U.S. PATENT DOCUMENTS

| 3,962,546 | 6/1976 | Hashimoto | 179/2 DP |
| 4,009,342 | 2/1977 | Fahrenschon et al. | 179/2 DP |
| 4,321,429 | 3/1982 | Takatsuki et al. | 179/2 DP |

FOREIGN PATENT DOCUMENTS 3229  1/1980  Japan ................. 179/2 DP

OTHER PUBLICATIONS

IBM Technical Disclosure Bulletin, vol. 21, No. 8, Jan. 1979.

Japan Electrical Communication Society National Conf., vol. 8-1.

*Primary Examiner*—Gene Z. Rubinson
*Assistant Examiner*—W. J. Brady
*Attorney, Agent, or Firm*—Lowe King Price & Becker

[57] ABSTRACT

A communication system includes a device connected to a line through a hybrid coil and performing the transmission/reception of data and voice from and/to an opposite device. A switching relay of a voice transmission/voice reception in the device is controlled by a control data from the opposite device. The control data is sent out a plurality of times and after detection in a data detecting portion, a continuous transmission check is made in a continuous transmission checking portion. In the device, a connection of data detecting portion and the line and a connection of a microphone and the line are alternately disconnected by a relay, so that a detection of data is made only when the transmission of voice is interrupted. The disconnecting relay is driven in response to a pulse of a predetermined duty ratio. If and when the first data is detected in the data detecting portion, a monostable multivibrator is triggered so that the disconnecting relay is maintained in condition that the detecting portion and the line are connected in response to the triggered output.

5 Claims, 4 Drawing Figures

FIG. I
(PRIOR ART)

DATA COMMUNICATION SYSTEM

BACKGROUND OF THE INVENTION

1. Field of the Invention

The present invention relates to a data communication system and more particularly, relates to a data communication system adapted such that voice communication as well as data communication is made possible.

2. Description of the Prior Art

Such a data communication system has been used in an emergency telephone or informer system in which an emergency call is possible, for example. FIG. 1 is a schematic block diagram showing a conventional emergency informer system used in an elevator, in which system an emergency call is possible. A receiving center 1 for supervising a failure of an elevator is connected through a telephone line 3 to an emergency call unit 2 having an emergency call capability, provided with the elevator. At the time of emergency, the emergency call unit 2 is connected to a receiving center 1 through the line 3 by depressing a call request switch 21. A circuit responsive to depression of the call request switch 21 for providing a line between the emergency call unit 2 and the center 1 is not shown. Then, a predetermined emergency call is made from the emergency call unit 2 to the center 1 through an operation of modems 5A, 5B and communication controls 6 and 14. More particularly, first a predetermined emergency call code is produced in the communication control 14 included in the emergency call unit 2. Next the code is modulated by the modem 5B and is sent to the center 1 through the line 3 in the center 1, and the sent signal is demodulated by the modem 5A and then is applied to the communication control 6 in the center 1. The communication control 6 makes a predetermined emergency call such as elevator emergency stop, when the control 6 detects the emergency call code. In addition, an operator on the center side and a passenger can speak to each other using a handset 4 in the center 1 and a microphone 19 and a passenger 20 in the elevator, respectively. However, if both of them are adapted such that simultaneous transmission/reception becomes possible such as a subscriber's station, voice from the speaker 20 is applied to the microphone 19 and hence a hauling phenomenon occurs. In order to prevent this phenomenon, a remote press-to-talk method has been used wherein an operator on the center 1 side actuates a press-to-talk switch 10 so that an L relay 16 in the emergency call unit 2 is controlled to be switched. The operation is made by detecting a voice communication control code sent from the center 1 by a voice communication control code detecting portion 15 in the emergency call unit 2 and by controlling the L relay 16 in accordance with the content of the detected code to switch a transmission/reception by a contact 17.

Now the remote press-to-talk operation will be described in detail. An operator in the center 1 turns a call request switch 9 off in response to an emergency call from the emergency call unit 2. As a result, an M relay 7 is released and the handset 4 is connected to the line 3, so that the operator can listen to voice of a speaker on the side of the emergency call unit 2 through the handset 4. If and when the operator wishes to send his voice to the speaker 20, he depresses the press-to-talk switch 10. Then, a monostable multivibrator 11 is triggered and hence a logical "H" pulse having a predetermined pulse width appears in the output Q thereof. Since the pulse renders a transistor 12 conductive, the M relay 7 makes a timing operation corresponding to the pulse width. Correspondingly, an m contact 8 operates and the line 3 is connected to the modem 5A side. On the other hand, the output Q of the monostable multivibrator 11 and the state of the press-to-talk switch 10 are inputted to the communication control 6. If and when an input A to the control 6 is a logical "L" (a press-to-talk switch 10 is on) and an input B is a logical "H", the communication control 6 sends out to the modem 5A a receiving code which is a voice communication control code for switching the emergency call unit 2 to the receiving side. The receiving code is modulated by the modem 5A, passes through the actuating m contact 8, and is detected by a voice communication control code detecting portion 15 through the line 3, a hybrid coil 13, a modem 5B, a communication control 14, and a call request switch 21. The voice communication control code detecting portion 15 makes the L relay 16 operate when the detecting portion 15 detects a receiving code. As a result, an l contact 17 operates so that the line 3 is connected to the speaker 20. In such a way, the operator in the center 1 can send his voice to the passenger in the elevator through the speaker 20.

In case where, in the center, voice communication state is switched to a receiving state, the operator in the center 1 returns the press-to-talk switch 10 to the former state, so that the monostable multivibrator 11 is again triggered at the trailing edge and makes the M relay 7 perform a timing operation just as the above described case and also makes the input B to the communication control 6 become a logical "H". Since the input A is a logical "H" (a press-to-talk switch 10 is off) and the input B is a logical "H", the communication control 6 sends out to the emergency call unit 2 a transmission code which is a voice communication control code for switching the unit 2 to a transmission side. The emergency call unit 2 is controlled to be switched to a transmission side in the above described manner.

Since a conventional data communication system is structured as described in the foregoing, a voice signal from the microphone 19 is applied to the modem 5B through the hybrid coil 13 at the time of transmission from the emergency call unit 2 to the center 1, which causes an S/N ratio of an input of the modem 5B to be decreased. Therefore, if an incoming level from the line 3 is in a lower state, for example, less than −30dBm, the modem 5B frequently outputs an error code making an erroneous control or a non-control, which is a significant defect.

SUMMARY OF THE INVENTION

The present invention is directed to a system for making a communication of data and voice through a two-wire line like a telephone line. A data communication system in accordance with the present invention comprises a device connected through the line to an opposite device which is adapted such that at least data is transmitted and voice is received, said device including data receiving means for receiving the data sent from the opposite device, voice transmitting means for transmitting voice to the opposite device, a switching means for alternately disabling the data receiving means and the voice transmitting means so that the data reception and the voice transmission are alternately made. The data receiving means and the voice transmitting means are connected to a line by means of line coupling means.

In a preferred embodiment of the present invention, data transmissions from the opposite device are repeated a plurality of times so that at least one data is received by the data receiving means in the device during a period when the data receiving means is not disabled. The switching means comprises data-reception-continuing-means responsive to the first reception of the data in the data receiving means for continuing the state where the data receiving means is not disabled during a further predetermined time period. A data receiving means comprises determining means for determining whether the data was received a predetermined plurality of times.

Accordingly, a principal object of the present invention is to provide a data communication system wherein when a device connected to the opposite device through a two-wire line transmits voice to the opposite device, the device never erroneously receives the data from the opposite device. These objects and other objects, features, aspects and advantages of the present invention will become more apparent from the following detailed description of the present invention when taken in conjunction with the accompanying drawings.

DETAILED DESCRIPTION OF THE PRESENT EMBODIMENTS

Figure 1:
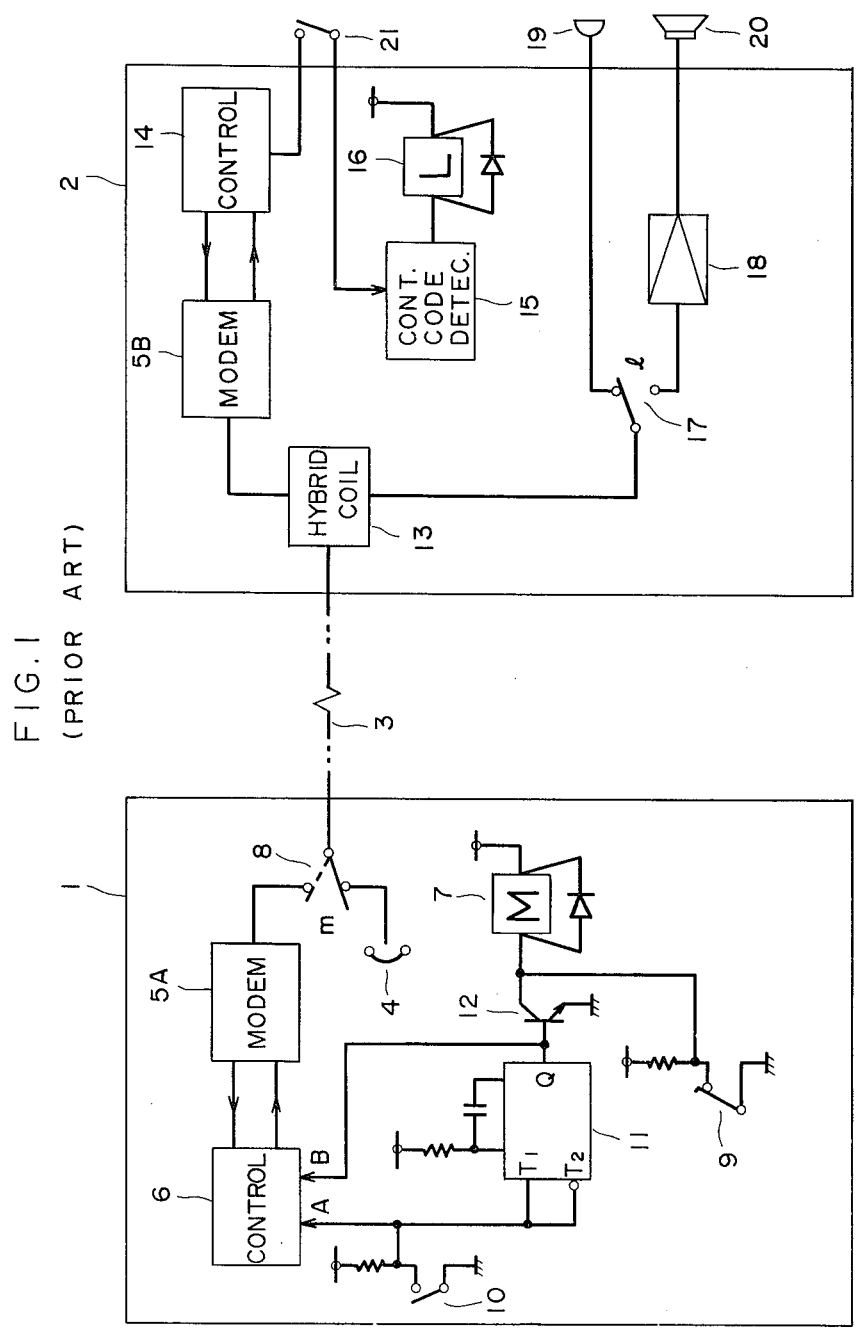
FIG. 1 is a schematic block diagram showing a conventional emergency call system having a capability of emergency call.
Figure 2:
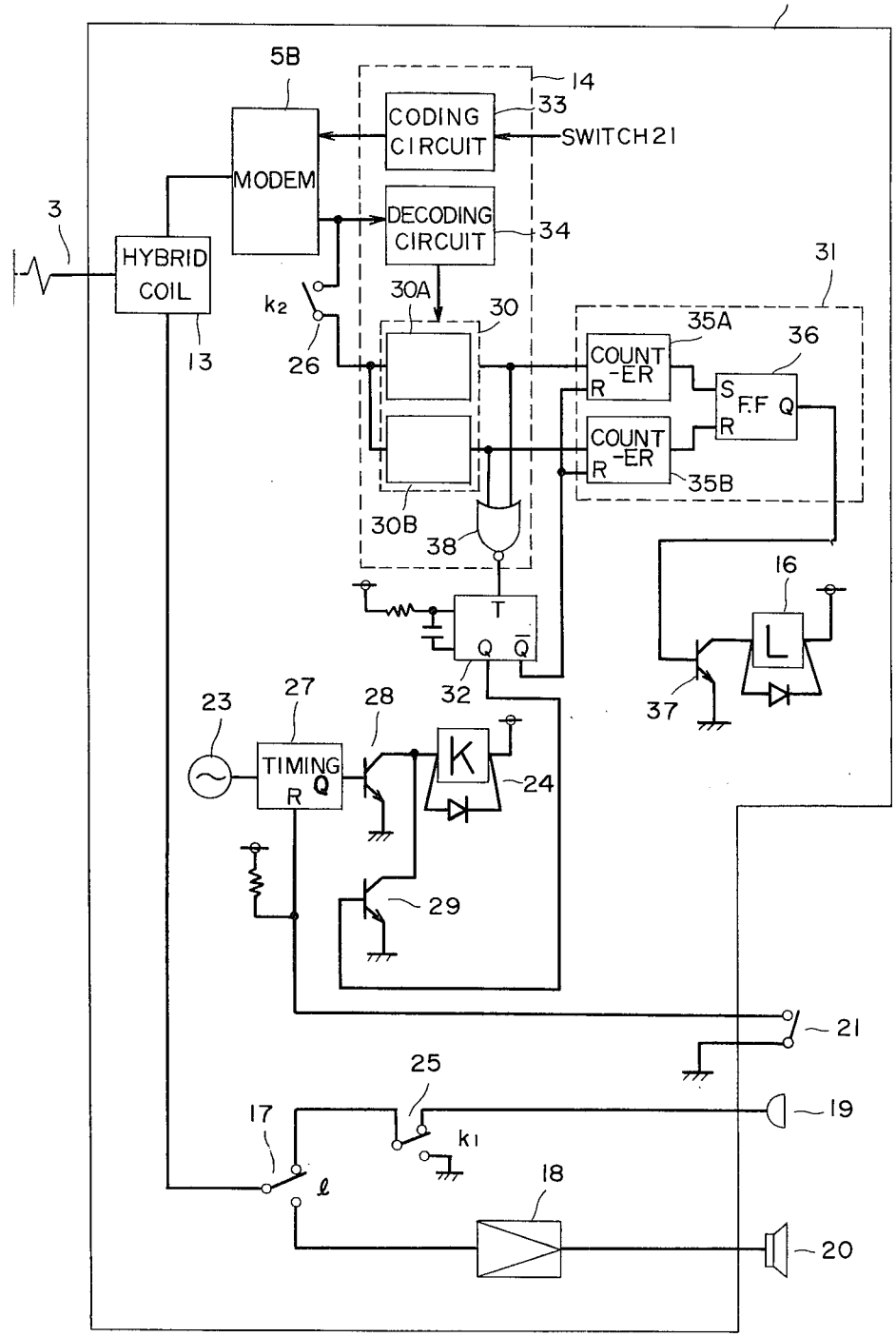
FIG. 2 is a schematic block diagram showing an emergency call system utilizing a data communication system of a preferred embodiment of the present invention.
Figure 3:
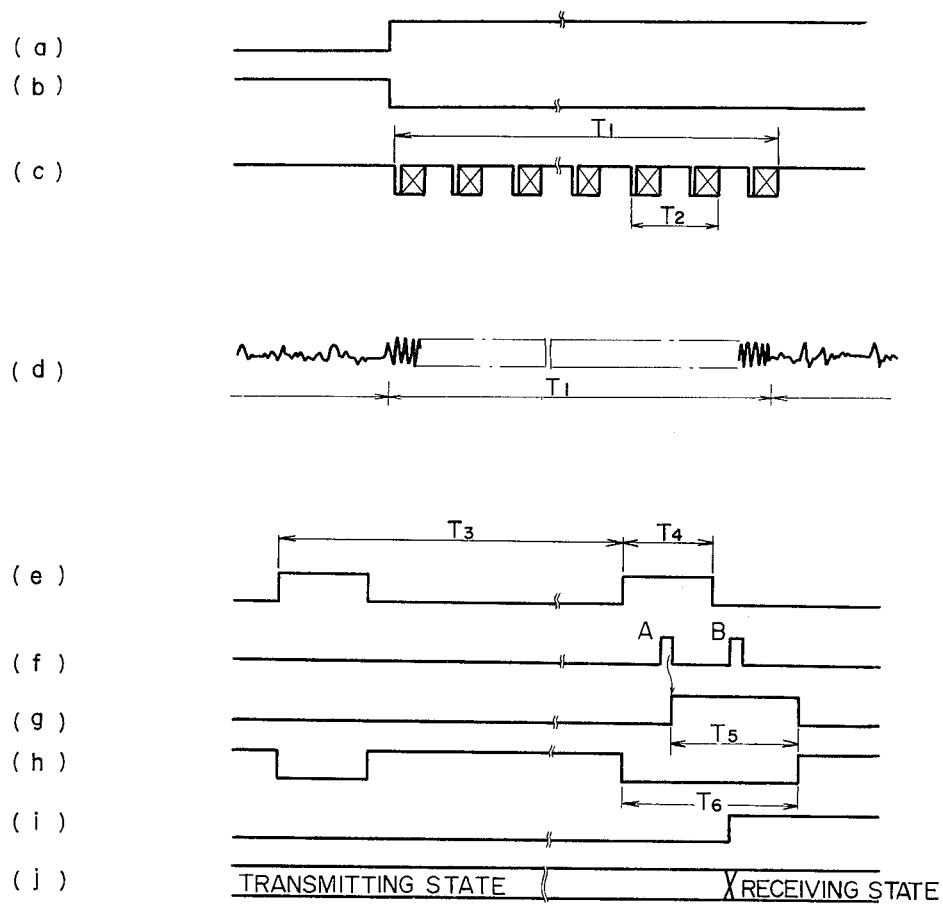
FIG. 3 is a timing chart showing an operation of the FIG. 2 system.

FIG. 2 is a schematic block diagram showing an emergency call system utilizing a data communication system of a preferred embodiment of the present invention. FIG. 3 shows a timing chart of an operation thereof. Referring to FIGS. 2 and 3, a preferred embodiment of the present invention will be described. Since the device in the center 1 is basically the same as the conventional one, the description regarding the center 1 is made based on FIG. 1.

First, a call request to the center 1 is provided by way of depression of a call request switch 21 included in emergency call unit 22 having a capability of emergency call. As a result, a coding circuit 33 within a communication control 14 is enabled and then a predetermined an emergency call code is sent to the center 1 through a modem 5B and a hybrid coil 13. A decoding circuit 34 receives a reply code from the center 1 and enables a voice communication control code detecting portion 30. On the other hand, in response to depression of the call request switch 21, a logical "L" signal is inputted to a reset input R of a timing producing portion 27 ( in this case it is assumed that a logical "H" is used as a reset signal), so that the timing producing portion 27 applies a signal (e) shown in FIG. 3 to a base of a transistor 28 in response to clocks from a clock source 23. The transistor 28 is rendered conductive or on for a logical "H" period (a period of $T_4$) of the signal (e). As a result, a K relay 24 starts making an intermittent operation that the relay 24 is released for the period of the logical "L" of the output Q of the timing producing portion 27. This operation makes the k1 and k2 contacts 25 and 26 for the K relay 24 open or close. Because of the switching operation of the k1 contact 25, voice being transmitted from the microphone 19 is not transmitted to the contact 17 for the logical "H" period of the signal in FIG. 3 (e). To the contrary, because of the switching operation of the k2 contact 26, the information from the center 1 is transmitted to the voice communication control code detecting portion 30 only for the logical "H" period of the signal in FIG. 3 (e). In such a way, the modem 5B in the emergency call unit 22 can demodulate the signal from the line 5B without interference by a voice signal applied to the modem 5B from the microphone 19 through the hybrid coil 13 for the period in the operated state of the K relay 24 (which period corresponds to the ($T_3$) period). Therefore, even if the received level of the signal from the line 3 is low, such as $-30 \sim -45$dBm, the input to the modem 5B can keep an excellent S/N ratio.

Meanwhile, although an operator on the center side may not understand the content of voice communication in some duty cycle of the operation of the K relay 24, due to an intermittent transmission of voice, it has been able to be confirmed by an experiment that the content of voice communication can be fully understood because of redundancy of voice if the duty ratio of an operation, that is, $T_4/T_3$ in FIG. 3 (e) is about less than 0.08 and $T_4$ is about less than 30ms. According to the above described operation, voice communication control codes from the center 1 can be correctly detected by the voice communication control code detecting portion 30 in the emergency call unit 22 even if a passenger in the elevator is transmitting his voice.

Now a further detailed description of FIG. 3 is as follows. It is assumed that a data communication speed is 1200 bit/sec since $T_4$ is restricted to about less than 30ms. It is further assumed that a start/stop synchronization method using a start/stop bit is adopted. In the center 1, an emergency call code from the above described emergency call unit 22 is demodulated in the modem 5A and is applied to the communication control 6. The communication control 6 performs a predetermined emergency call and also returns a reply code to the emergency call unit 22. An operator in the center 1 knowing an emergency call depresses a press-to-talk switch 10 (refer to FIG. 3 (a)) and hence a transmission of voice to the emergency call unit 22 is started. An input to the communication control 6 becomes a logical "L" by depression of the press-to-talk switch 10 (see FIG. 3 (b)) and hence a modulation signal in FIG. 3 (c) is inputted to the modem 5A from the communication control 6. As a result, as shown in FIG. 3 (d), voice signal is temporarily interrupted, so that a communication control signal (a receiving voice communication code) is fed toward the emergency call unit 22. The receiving voice communication code is repeatedly sent during the period of $T_1$. At this time, $T_1$ and $T_2$ are selected as follows.

$$T_1 > T_3 + T_4 \tag{1}$$

$$T_2 > T_4 \tag{2}$$

According to the conditions of the equations (1) and (2), the emergency call unit 22 receives at least one word within $T_1$ during the period of the logical "H" in FIG.

3 (e) and the voice communication control code detecting portion 30 can detect the same word.

Since the K relay 24 is operating all the time of a call at the timing of FIG. 3 (e), it is considered that the modem 5B erroneously operates for the period of $T_4$ due to a voice signal from the line and the like and provides the same demodulation data as the voice communication control code, so that an error control occurs. In order to avoid such error control, an error detection is made by adding some redundancy to the code. For example, if and when an N continuous transmission check which detects whether the same code can be received N times is utilized, it is naturally restricted by $T_4$. Now assuming that one character is transmitted at the rate of 1200 bits/sec wherein one word includes 10 bits, that is, a start bit (1 bit)+data bits (7 bits)+a parity bit (1 bit)+a stop bit (1 bit), at least one character can be received for the $T_4$ period even if the $T_4$ is 30ms. Accordingly, the continuous transmission check of N times during the $T_4$ period is impossible. Therefore, in the emergency call unit in accordance with the present invention, at the time when the control code detecting portion 30 detects a voice communication control code, the monostable vibrator 32 is triggered in response to the detecting output to drive the transistor 29 and hence the K relay 24 is caused to make a continuous operation for the period of $T_5$, so that the subsequent code can be received and thus a continuous transmission check of N times becomes possible. Referring to FIG. 3 (f), (g) and (h), a further detailed description will be described in the following. The voice communication control code detecting portion 30 outputs a detection signal A as shown in FIG. 3 (f) in response to detection of a voice communication control code for the $T_4$ period, that is, while the k2 contact is closed. The detection signal A is applied to the monostable multivibrator 32 through a NOR gate 38. The monostable multivibrator 32 is triggered in response to the trailing edge of the detection signal A so that a pulse signal having a predetermined time width $T_5$ as shown in FIG. 3 (g) is applied to the base of the transistor 29. The transistor 29 is adapted to be rendered conductive in response to the logical "H" period ($T_5$) period of the pulse signal (g). As described in the foregoing, the transistor 28 is rendered on for the $T_4$ period and the k2 contact 26 is closed for that period. When a voice communication control code is detected during the $T_4$ period, the transistor 29 becomes on in response to that timing and continues to be on for the $T_5$ period. Hence the K relay 24 keeps the operating state for the $T_6$ period as shown in FIG. 3 (h), so that the k2 contact 26 remains closed for the $T_6$ period. Accordingly, the subsequent voice communication control code can be detected in the voice communication control code detecting portion 30. Thus, the N times-continuous transmission check becomes possible. The $T_6$ period is determined based on the $T_4$ and $T_5$ periods. However, since the $T_4$ period is limited to some extent as described in the foregoing, the adjustment of the $T_6$ period is made by controlling the $T_5$ period. Preferably, the $T_5$ period is determined as short as possible.

On the other hand, the inverted output $\overline{Q}$ of the monostable multivibrator 32 is applied to counters 35A and 35B so that the reset of the counters 35A and 35B is released. As a result, the counters 35A and 35B start counting a detection output subsequent to the detection output A and applies a set or reset signal to a flip-flop 36 in response to the count N-1. For example, in case of 2-continuous transmission check, a set or reset signal is applied to the flip-flop 36 in response to the count of the detection output B in FIG. 3 (f). The output from the counter 35A sets the flip-flop 36 and the output from the counter 35B resets the flip-flop 36. The transistor 37 is driven in response to the output from the flip-flop 36 and hence the L relay 16 operates corresponding to this as described in FIG. 3 (i). Thus, an l contact 17 makes a switching operation of transmission/reception. For example, in FIG. 3 (j), a procedure is shown wherein a device 22 is switched from a transmitting state to a receiving state by way of 2-continuous transmission check.

Figure 4:
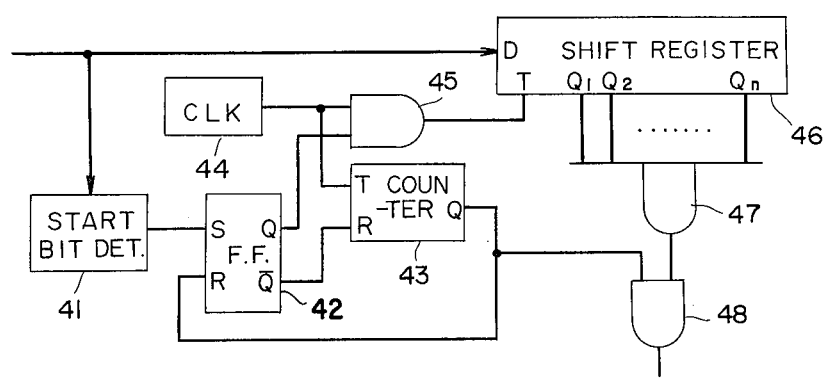
FIG. 4 is a block diagram showing in detail a call control code detecting portion 30 shown in FIG. 2.

FIG. 4 is a block diagram showing in detail a voice communication control code detecting portion 30 as shown in FIG. 2. This portion is not so important to the present invention and hence only a brief description will be explained in the following. When a start bit detecting portion 41 detects a significant start bit from serial data, it sets the flip-flop 42. The reset of the counter 43 is released in response to the output $\overline{Q}$ from the flop-flop 42 and also an AND gate 45 is enabled. Correspondingly, in synchronization with clocks generated in a clock generator 44, the data of a single character is inputted to the shift register 46. On the other hand, the counter 43 applies an output Q to the flip-flops 42 and an AND gate 48 at the timing when a stop bit is inputted to the shift register 46, so that the flip-flop 42 is reset and also the AND gate 48 is enabled to sample the gate 47 for code detection. As a result, if the particular code is detected, a detection pulse is outputted.

Since the emergency call unit of a preferred embodiment of the present invention is structured as described in the foregoing, even if an erroneous detection signal due to a voice signal and the like from the center is outputted from the voice communication control code detecting portion 30, a voice communication control code is not received again for the subsequent period of $T_5$ and hence the communication control 31 performing a continuous check does not control the L relay 16. Although it might be considered that voice is more or less interrupted for the $T_5$ period, such interruption is caused only when the voice communication control code is detected and hence the influence of such interruption on voice communication can be neglected. In addition, since the condition in which voice breaks due to erroneous detection of a voice communication control code does not so frequently occur, there is few obstacles to voice communication. If and when an operator in the center returns voice communication to a receiving state in the center side, he returns the press-to-talk switch 10 to the former state. An emergency call unit 22 can release the L relay 16 in response to detection of a transmitting voice communication code from the center 1, in accordance with the above described operation associated with a conventional technique.

Meanwhile, although the above described embodiment is directed to an embodiment wherein codes received in an emergency call unit 22 comprise only two kinds of voice communication control codes for switching a receiving voice communication or a transmitting voice communication, it is possible to receive various kinds of codes and hence it is not intended to limit the code to voice communication control codes. In addition, the format of the voice communication control code is not intended to be limited to a continuous transmission of the same code as shown in FIG. 3 (c). For example, if and when a header which can be easily detected is added to a code and is detected during the period of T₄, then a predetermined control can be made by reading out information of error detecting codes subsequent to the header and hence a detection capability over the above described embodiment can become possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data communication system for making a communication of data and voice through a two-wired line, comprising:
   a device connected through said line to an opposite device which is adapted to transmit at least data and to receive voice, said device comprising
   data receiving means for receiving said data transmitted from said opposite device,
   voice transmitting means for transmitting said voice to said opposite device,
   switching means for alternately disabling said data receiving means and said voice transmitting means so that data reception and voice transmission are alternately made,
   line coupling means for connecting said data receiving means and said voice transmitting means to said line,
   wherein said line coupling means is a hybrid coil,
   said switching means alternately disconnects a connection between said data receiving means and said coupling means and a connection between said voice transmitting means and said line coupling means,
   said switching means includes
   pulse signal generating means for generating a pulse signal of a predetermined duty ratio, and
   a relay for alternately disconnecting said connections in response to said pulse signal.

2. A data communication system in accordance with claim 1, wherein
   said relay is adapted to disconnect the connection between said data receiving means and said line coupling means in response to one logic level of said pulse signal and to disconnect the connection between said voice transmitting means and said line coupling means in response to another logic level of said pulse signal, and
   said duty ratio of said pulse signal is determined to be less than 0.08 and the time interval of the other logic level of said pulse signal is determined to be less than 30ms.

3. A data communication system in accordance with claim 1, wherein
   said device comprises an emergency call unit having an emergency call capability, and
   said opposite device comprises a center unit for monitoring an occurrence of said emergency call.

4. A data communication system for making a communication of data and voice through a two-wired line, comprising:
   a device connected through said line to an opposite device which is adapted to transmit at least data and to receive voice, said device comprising
   data receiving means for receiving said data transmitted from said opposite device,
   voice transmitting means for transmitting said voice to said opposite device,
   switching means for alternately disabling said data receiving means and said voice transmitting means so that data reception and voice transmission are alternately made,
   line coupling means for connecting said receiving means and said voice transmitting means to said line,
   the data transmission from said opposite device to said device is repeatedly made a plurality of times so that at least one data is received by said data receiving means in said device during the period when said data receiving means in said device is not disabled,
   said switching means includes data reception continuing means in response to an initial reception of said data in said data receiving means for continuing during a further predetermined time period the state in which said data receiving means is not disabled, and
   said data receiving means includes means for determining whether said data is received a predetermined plurality of times.

5. A data communication system in accordance with claim 4, wherein
   said opposite device is further adapted to transmit voice,
   said device further includes voice receiving means for receiving said voice transmitted from said opposite device,
   said switching means includes relay means,
   said voice transmitting means and said voice receiving means are selectively connected to said line coupling means by said relay means,
   said data transmitted from said opposite device includes control data for controlling said relay means, and
   said determining means controls said relay means based on the content of said control data when said control data is received said predetermined plurality of times.

* * * * *